(12) United States Patent
Luo et al.

(10) Patent No.: US 9,253,768 B2
(45) Date of Patent: Feb. 2, 2016

(54) REFERENCE SIGNALS FOR AN ENHANCED PHYSICAL DOWNLINK CONTROL CHANNEL

(71) Applicant: QUALCOMM Incorporated, San Diego, CA (US)

(72) Inventors: Tao Luo, San Diego, CA (US); Wanshi Chen, San Diego, CA (US); Peter Gaal, San Diego, CA (US); Hao Xu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 155 days.

(21) Appl. No.: 13/802,330

(22) Filed: Mar. 13, 2013

(65) Prior Publication Data

US 2014/0098751 A1    Apr. 10, 2014

Related U.S. Application Data

(60) Provisional application No. 61/711,143, filed on Oct. 8, 2012, provisional application No. 61/711,182, filed on Oct. 8, 2012.

(51) Int. Cl.
*H04W 4/00* (2009.01)
*H04W 72/04* (2009.01)
*H04L 27/26* (2006.01)

(52) U.S. Cl.
CPC ......... *H04W 72/042* (2013.01); *H04L 27/2613* (2013.01)

(58) Field of Classification Search
None
See application file for complete search history.

(56) References Cited

U.S. PATENT DOCUMENTS

| | | | |
|---|---|---|---|
| 2011/0267972 A1 | 11/2011 | Yoon et al. | |
| 2012/0176884 A1 | 7/2012 | Zhang et al. | |
| 2012/0207105 A1 | 8/2012 | Geirhofer et al. | |
| 2012/0307768 A1 | 12/2012 | Xu et al. | |
| 2013/0083752 A1* | 4/2013 | Kim et al. | 370/329 |
| 2013/0188558 A1* | 7/2013 | Nam et al. | 370/328 |
| 2013/0215835 A1* | 8/2013 | Chen et al. | 370/329 |
| 2013/0215845 A1* | 8/2013 | Lee et al. | 370/329 |
| 2013/0265980 A1* | 10/2013 | Zhu; Yuan | H04L 1/06 370/329 |
| 2014/0219212 A1* | 8/2014 | Seo et al. | 370/329 |
| 2014/0301329 A1* | 10/2014 | Kim et al. | 370/329 |
| 2015/0003352 A1* | 1/2015 | Seo et al. | 370/329 |
| 2015/0139079 A1* | 5/2015 | Zhu; Yuan | H04N 21/2365 370/329 |

OTHER PUBLICATIONS

Huawei et al: "DMRS sequences for ePDCCH", 3GPP Draft; R1-120870, 3rd Generation Partnership Project (3GPP), Mobile Competence Centre, vol. RAN WG1, Feb. 13, 2012, XP050563409, Sophia-Antipolis Cedex ; France [retrieved on Feb. 13, 2012].
International Search Report and Written Opinion—PCT/US2013/060742—ISA/EPO—Nov. 25, 2013.

(Continued)

*Primary Examiner* — Jutai Kao
(74) *Attorney, Agent, or Firm* — Seyfarth Shaw LLP

(57) ABSTRACT

A method of wireless communication includes generating a first reference signal (e.g., DM-RS) based on a first scrambling identifier. The method also includes generating a second reference signal (e.g., DM-RS) based on a second scrambling identifier. The second scrambling identifier is different from the first scrambling identifier. The method further includes transmitting the first reference signal for a control channel (e.g., EPDCCH) and transmitting the second reference signal for a data channel (e.g., PDSCH).

39 Claims, 12 Drawing Sheets

(56) References Cited

OTHER PUBLICATIONS

QUALCOMM Incorporated: "Remaining aspects of DM-RS for EPDCCH", 3GPP Draft; R1-124452 Remaining Aspects of DM-RS for EPDCCH, 3rd Generation Partnership Project (3GPP), Mobile Competence Centre, vol. RAN WG1 Sep. 29, 2012, XP050662343, Sophia-Antipolis Cedex; France [retrieved on Sep. 29, 2012].

QUALCOMM Incorporated: "Remaining aspects of DM-RS for EPDCCH", 3GPP Draft; R1-124563 Remaining Aspects of DM-RS for EPDCCH, 3rd Generation Partnership Project (3GPP), Mobile Competence Centre, vol. RAN WG1 Oct. 12, 2012, XP050662445, Sophia-Antipolis Cedex; France [retrieved on Oct. 12, 2012].

Samsung: "DMRS Scrambling for Downlink CoMP", 3GPP Draft; R1-114226, DMRS Scrambling, 3RD Generation Partnership Project (3GPP), Mobile Competence Centre, vol. RAN WG1, Nov. 8, 2011, XP050562151, Sophia-Antipolis Cedex; France [retrieved on Nov. 8, 2011] the whole document.

Samsung: "DMRS Scrambling for Enhanced Control Channels", 3GPP Draft; R1-122251 DMRS Scrambling EPDCCH, 3RD Generation Partnership Project (3GPP), Mobile Competence Centre, vol. Ran WG1, May 12, 2012, XP050600515, Sophia-Antipolis Cedex ; France [retrieved May 12, 2012. ].

3GPP, "Further discussions on UL DM RS Enhancement for UL CoMP", 3GPP TSG RAN WG1 #68, R1-120179, 7.5.6.1.1, Samsung, Dresden, Germany, Feb. 6-10, 2012, 2 pgs.

\* cited by examiner

REFERENCE SIGNALS FOR AN ENHANCED PHYSICAL DOWNLINK CONTROL CHANNEL

CROSS-REFERENCE TO RELATED APPLICATION

This application claims the benefit under 35 U.S.C. §119(e) to U.S. Provisional Patent Application No. 61/711,143 entitled "REFERENCE SIGNALS FOR ENHANCED PHYSICAL DOWNLINK CONTROL CHANNEL," filed on Oct. 8, 2012, and U.S. Provisional Patent Application No. 61/711,182 entitled "REFERENCE SIGNALS FOR ENHANCED PHYSICAL DOWNLINK CONTROL CHANNEL," filed on Oct. 8, 2012, the disclosures of which are expressly incorporated by reference herein in their entireties.

BACKGROUND

1. Field

Aspects of the present disclosure relate generally to wireless communication systems, and more particularly to references signals for an enhanced control channel.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In one aspect of the present disclosure, a method of wireless communication is disclosed. The method includes generating a first reference signal based at least in part on a first scrambling identifier (ID). The method also includes generating a second reference signal based at least in part on a second scrambling ID that is different from the first scrambling ID. The method further includes transmitting the first reference signal for a control channel. The method still further includes transmitting the second reference signal for a data channel.

Another aspect of the present disclosure discloses an apparatus including means for generating a first reference signal based at least in part on a first scrambling ID. The apparatus also includes means for generating a second reference signal based at least in part on a second scrambling ID different that is from the first scrambling ID. The apparatus further includes means for transmitting the first reference signal for a control channel. The apparatus still further includes means for transmitting the second reference signal for a data channel.

In another aspect of the present disclosure, a computer program product for wireless communications in a wireless network having a non-transitory computer-readable medium is disclosed. The computer readable medium having non-transitory program code recorded thereon which, when executed by the processor(s), causes the processor(s) to perform operations of generating a first reference signal based at least in part on a first scrambling ID. The program code also causes the processor(s) to generate a second reference signal based at least in part on a second scrambling ID that is different from the first scrambling ID. The program code further causes the processor(s) to transmit the first reference signal for a control channel. The program code still further causes the processor(s) to transmit the second reference signal for a data channel.

Another aspect of the present disclosure discloses a wireless communication apparatus having a memory and at least one processor coupled to the memory. The processor(s) is configured to generate a first reference signal based at least in part on a first scrambling ID. The processor(s) is also configured to generate a second reference signal based at least in part on a second scrambling ID that is different from the first scrambling ID. The processor(s) is further configured to transmit the first reference signal for a control channel. The processor(s) is still further configured to transmit the second reference signal for a data channel.

In one aspect of the present disclosure, a method of wireless communication is disclosed. The method includes receiving a reference signal. The method also includes determining whether the reference signal is associated with a control channel or a data channel, based on a scrambling ID.

Another aspect of the present disclosure discloses an apparatus including means for generating a first reference signal based at least in part on a first scrambling ID. The apparatus also includes means for receiving a reference signal. The apparatus further includes means for determining whether the reference signal is associated with a control channel or a data channel, based on a scrambling ID.

In another aspect, a computer program product for wireless communications in a wireless network having a non-transitory computer-readable medium is disclosed. The computer readable medium has non-transitory program code recorded thereon which, when executed by the processor(s), causes the processor(s) to perform operations of receiving a reference signal. The program code further causes the processor(s) to determine whether the reference signal is associated with a control channel or a data channel, based on a scrambling ID.

Another aspect of the present disclosure discloses a wireless communication apparatus having a memory and at least one processor coupled to the memory. The processor(s) is configured to receive a reference signal. The processor(s) is also configured to determine whether the reference signal is associated with a control channel or a data channel, based on a scrambling ID.

In one aspect of the present disclosure, a method of wireless communication is disclosed. The method includes receiving a reference signal from a cell. The method also includes determining a channel associated with the reference signal. The method further includes determining a scrambling ID for the reference signal based on the determined channel. The method still further includes processing the determined channel based at least in part on the determined scrambling ID.

Another aspect of the present disclosure discloses an apparatus including means for receiving a reference signal from a cell. The apparatus also includes means for determining a channel associated with the reference signal. The apparatus further includes means for determining a scrambling ID for the reference signal based on the determined channel. The apparatus still further includes means for processing the determined channel based at least in part on the determined scrambling ID.

In another aspect of the present disclosure, a computer program product for wireless communications in a wireless network having a non-transitory computer-readable medium is disclosed. The computer readable medium has non-transitory program code recorded thereon which, when executed by the processor(s), causes the processor(s) to perform operations of receiving a reference signal from a cell. The program code also causes the processor(s) to determine a channel associated with the reference signal. The program code further causes the processor(s) to determine a scrambling ID for the reference signal based on the determined channel. The program code still further causes the processor(s) to process the determined channel based at least in part on the determined scrambling ID.

Another aspect of the present disclosure discloses a wireless communication apparatus having a memory and at least one processor coupled to the memory. The processor(s) is configured to receive a reference signal from a cell. The processor(s) is also configured to determine a channel associated with the reference signal. The processor(s) is further configured to determine a scrambling ID for the reference signal based on the determined channel. The processor(s) is still further configured to process the determined channel based at least in part on the determined scrambling ID.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1:
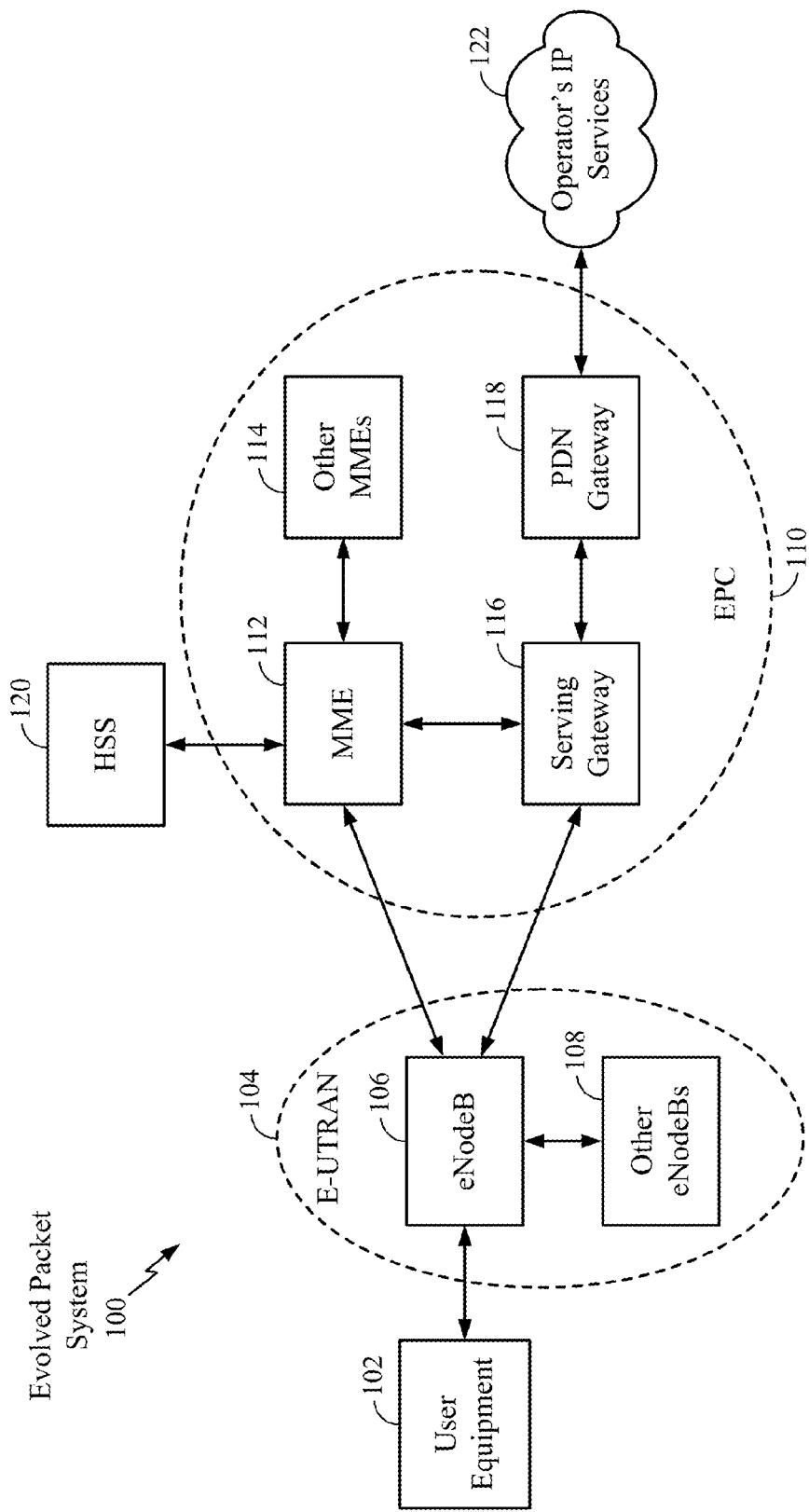
FIG. 1 is a diagram illustrating an example of a network architecture.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Aspects of the telecommunication systems are presented with reference to various apparatus and methods. These apparatus and methods are described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a non-transitory computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNodeB) 106 and other eNodeBs 108. The eNodeB 106 provides user and control plane protocol terminations toward the UE 102. The eNodeB 106 may be connected to the other eNodeBs 108 via a backhaul (e.g., an X2 interface). The eNodeB 106 may also be referred to as a base station, a base transceiver station, a radio base station, a radio transceiver, a transceiver function, a basic service set (BSS), an extended service set (ESS), or some other suitable terminology. The eNodeB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNodeB 106 is connected to the EPC 110 via, e.g., an S1 interface. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
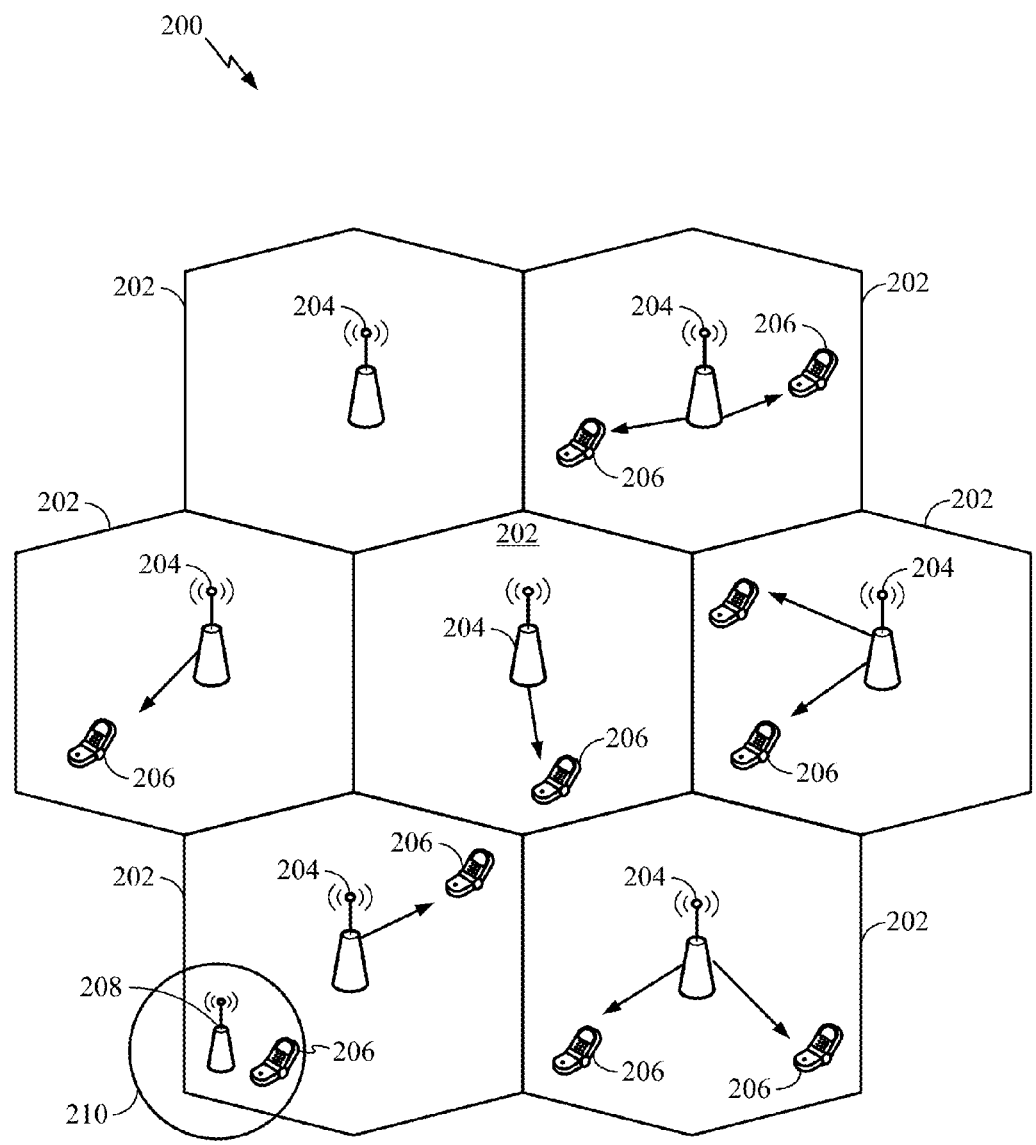
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNodeBs 208 may have cellular regions 210 that overlap with one or more of the cells 202. A lower power class eNodeB 208 may be a remote radio head (RRH), a femto cell (e.g., home eNodeB (HeNB)), a pico cell, or a micro cell. The macro eNodeBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNodeBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the downlink and SC-FDMA is used on the uplink to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNodeBs 204 may have multiple antennas supporting MIMO technology. The use of MIMO technology enables the eNodeBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity.

This is achieved by spatially precoding each data stream (i.e., applying a scaling of an amplitude and a phase) and then transmitting each spatially precoded stream through multiple transmit antennas on the downlink. The spatially precoded data streams arrive at the UE(s) 206 with different spatial signatures, which enables each of the UE(s) 206 to recover the one or more data streams destined for that UE 206. On the uplink, each UE 206 transmits a spatially precoded data stream, which enables the eNodeB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PAPR).

Figure 3:
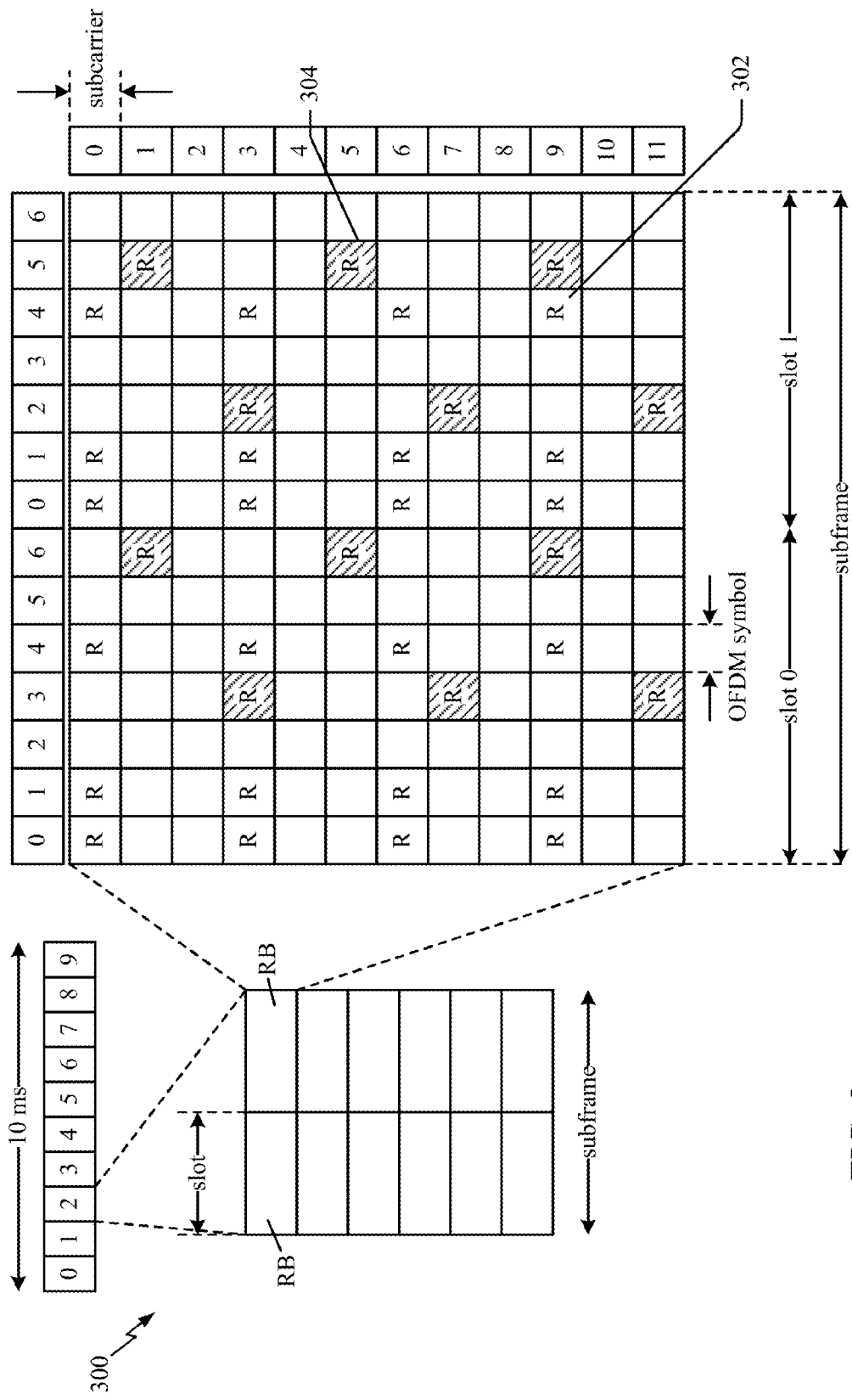
FIG. 3 is a diagram illustrating an example of a downlink frame structure in LTE.

FIG. 3 is a diagram 300 illustrating an example of a downlink frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include downlink reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 4:
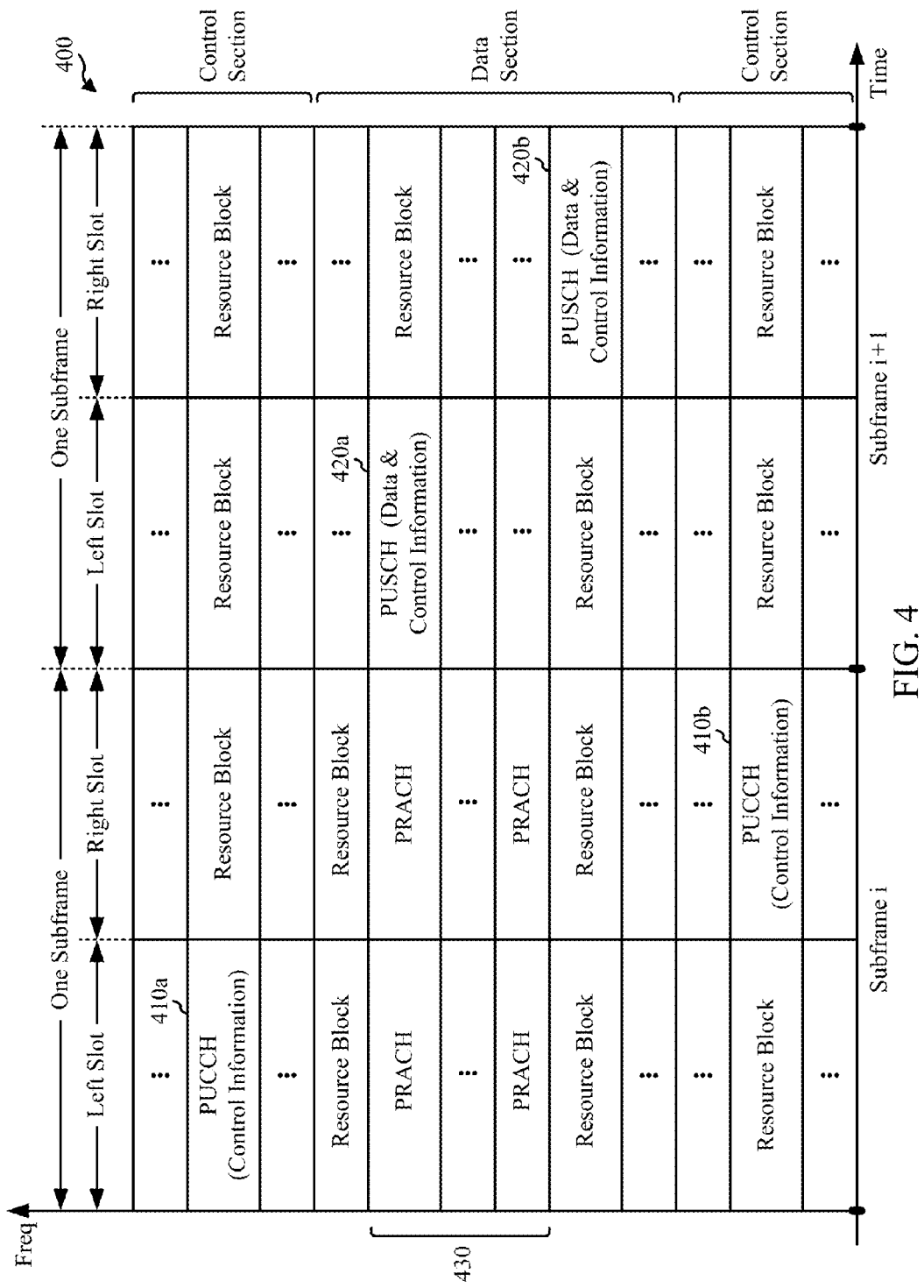
FIG. 4 is a diagram illustrating an example of an uplink frame structure in LTE.

FIG. 4 is a diagram 400 illustrating an example of an uplink frame structure in LTE. The available resource blocks for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The uplink frame structure results in the data section including contiguous subcarriers, which may allow a single UE to be assigned all of the contiguous subcarriers in the data section.

A UE may be assigned resource blocks 410a, 410b in the control section to transmit control information to an eNodeB. The UE may also be assigned resource blocks 420a, 420b in the data section to transmit data to the eNodeB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An uplink transmission may span both slots of a subframe and may hop across frequency.

A set of resource blocks may be used to perform initial system access and achieve uplink synchronization in a physical random access channel (PRACH) 430. The PRACH 430 carries a random sequence and cannot carry any uplink data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
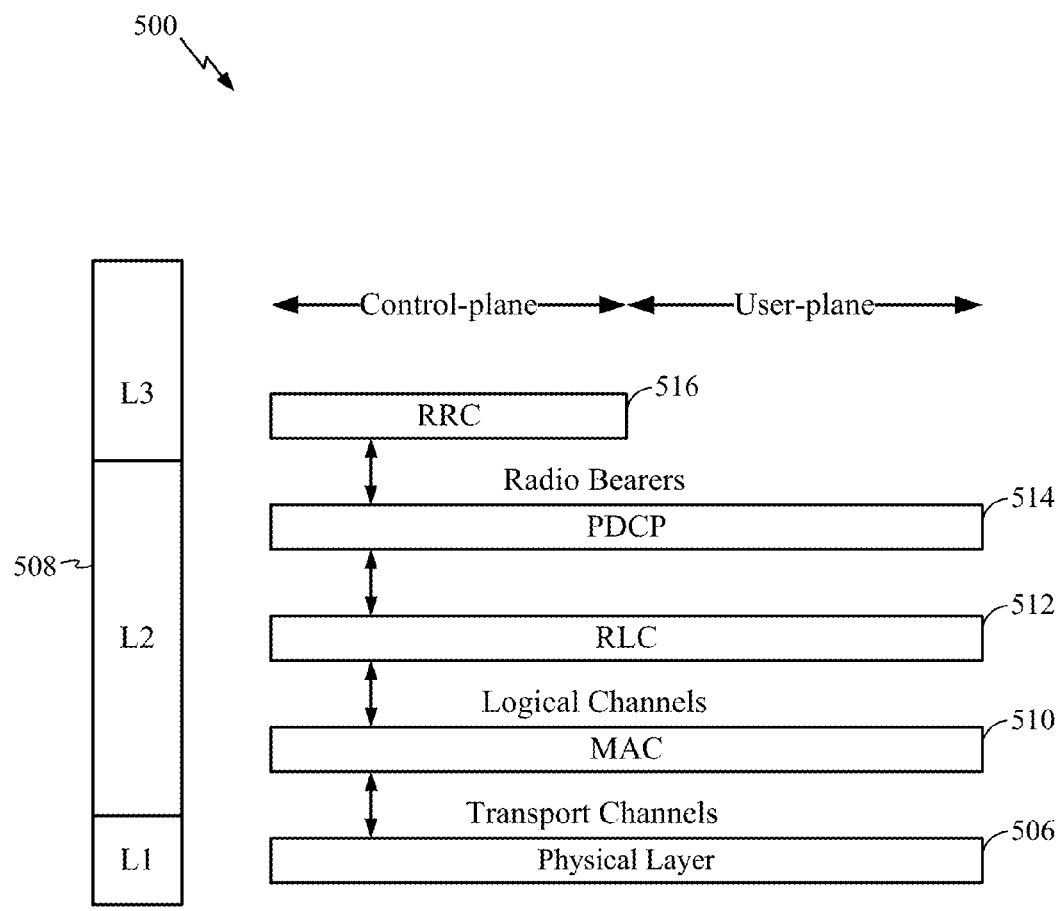
FIG. 5 is a diagram illustrating an example of a radio protocol architecture for the user and control plane.

FIG. 5 is a diagram 500 illustrating an example of a radio protocol architecture for the user and control planes in LTE. The radio protocol architecture for the UE and the eNodeB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNodeB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNodeB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNodeBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNodeB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNodeB and the UE.

Figure 6:
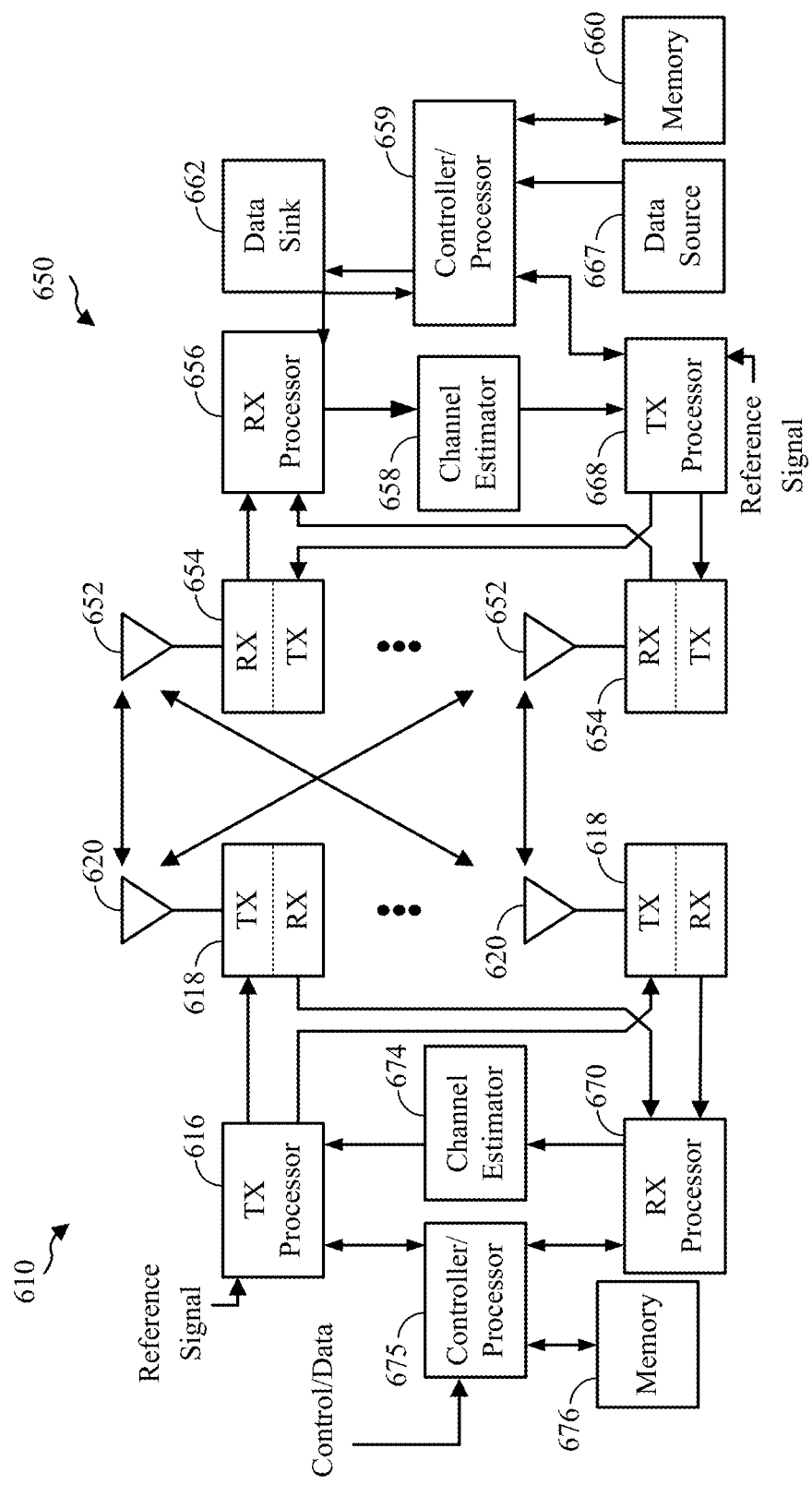
FIG. 6 is a diagram illustrating an example of an evolved Node B and user equipment in an access network.

FIG. 6 is a block diagram of an eNodeB 610 in communication with a UE 650 in an access network. In the downlink, upper layer packets from the core network are provided to a controller/processor 675. The controller/processor 675 implements the functionality of the L2 layer. In the downlink, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The TX processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receiver (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNodeB 610. These soft decisions may be based on channel estimates computed by the channel estimator 658. The soft decisions are then decoded and deinterleaved to recover the data and control signals that were originally transmitted by the eNodeB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the uplink, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the uplink, a data source 667 is used to provide upper layer packets to the controller/processor 659. The data source 667 represents all protocol layers above the L2 layer. Similar to the functionality described in connection with the downlink transmission by the eNodeB 610, the controller/processor 659 implements the L2 layer for the user plane and the control plane by providing header compression, ciphering, packet segmentation and reordering, and multiplexing between logical and transport channels based on radio resource allocations by the eNodeB 610. The controller/processor 659 is also responsible for HARQ operations, retransmission of lost packets, and signaling to the eNodeB 610.

Channel estimates derived by a channel estimator 658 from a reference signal or feedback transmitted by the eNodeB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The uplink transmission is processed at the eNodeB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the uplink, the controller/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

In Release 11, coordinated multipoint (CoMP) transmission schemes are supported. CoMP refers to schemes where multiple base stations coordinate transmissions to (downlink CoMP) or receptions from (uplink CoMP) one or more UEs. Downlink CoMP and uplink CoMP can be separately or jointed enabled for a UE. Examples of CoMP schemes include joint transmission, joint reception, coordinated beamforming and dynamic point selection. Joint transmission (DL CoMP) is where multiple eNodeBs transmit the same data meant for a UE. Joint reception (UL CoMP) is where multiple eNodeBs receive the same data meant for a UE. Coordinated beamforming is where an eNodeB transmits to its UE using beams that are chosen to reduce interference to UEs in neighboring cells. Dynamic point(s) selection is where the cell(s) involved in data transmissions may change from subframe to subframe.

CoMP may exist in homogeneous networks and/or heterogeneous networks (HetNet). The connection between the nodes involved in CoMP can be X2 (some latency, limited bandwidth) or fiber (min latency and "unlimited" bandwidth). In HetNet CoMP, low power nodes are sometimes also called remote radio head (RRH).

Reference Signals for an Enhanced Physical Downlink Control Channel (EPDCCH)

In LTE Releases 8, 9, and 10, a control channel, such as a physical downlink control channel (PDCCH) is located in the first several symbols of a subframe. The control channel is fully distributed in the entire system bandwidth. Furthermore, the control channel is time multiplexed (TDMed) with a shared channel, such as a physical downlink shared channel (PDSCH). Thus, a subframe is divided into a control region and a data region.

In LTE Release 11, an enhanced control channel, such as the enhanced PDCCH (EPDCCH), is introduced. In contrast to a typical control channel that occupies the first several control symbols in a subframe, the enhanced control channel may occupy the data region, similar to the shared channel (PDSCH). The enhanced control channel may increase control channel capacity, support frequency-domain inter-cell interference coordination (ICIC), improve spatial reuse of control channel resources, support beamforming and/or diversity, operate on the new carrier type and in multimedia broadcast over single frequency network (MBSFN) subframes, and coexist on the same carrier as conventional user equipments (UEs).

Figure 7:
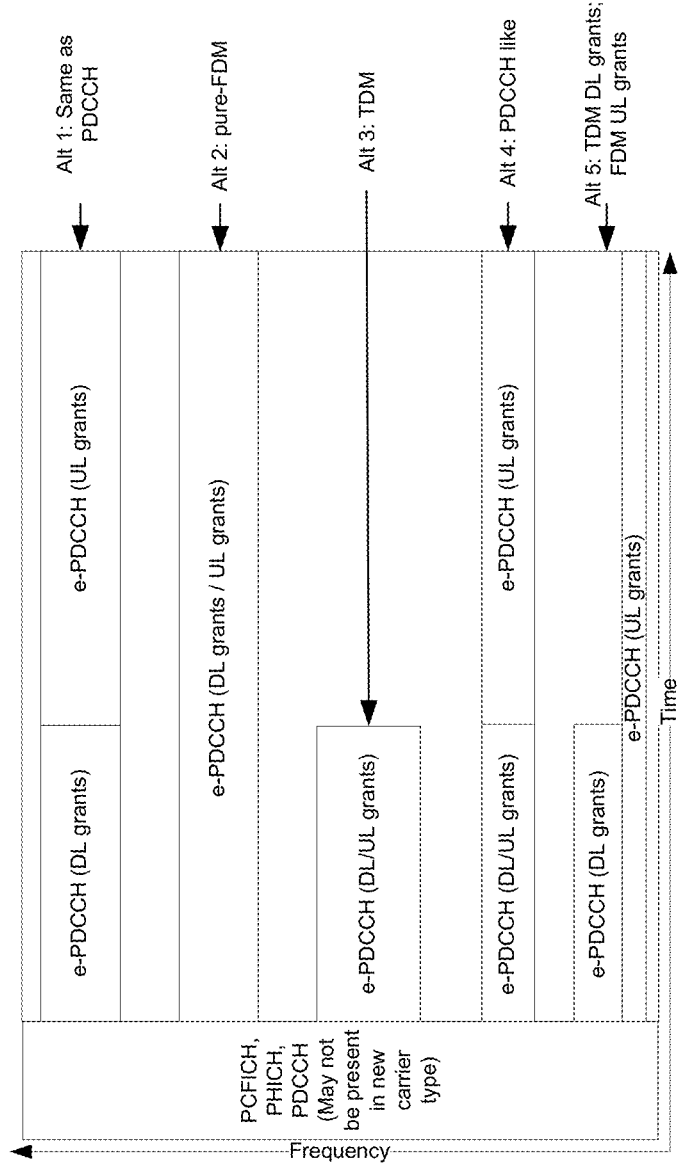
FIG. 7 is a is a block diagram illustrating various enhanced control channel structures.

FIG. 7 illustrates various enhanced control channel structures. For example, the enhanced control channel structure may be the same as the typical control channel structure. Alternately, the enhanced control channel may be pure-FDM. Optionally, in an alternate structure, the enhanced control channel structure is all TDM. Alternately, the enhanced control channel is similar, but not the same as the typical control channel. In another alternate structure, the enhanced control channel may combine TDM and FDM.

LTE Release 11 supports both localized and distributed transmissions of an enhanced control channel. Furthermore, LTE Release 11 supports an enhanced control channel demodulation reference signal (DM-RS). The enhanced control channel demodulation may use antenna ports 107, 108, 109, and 110. A shared channel, such as the PDSCH, uses antenna ports 7-14.

The enhanced control channel is based on frequency division multiplexing (FDM). That is, the enhanced control channel spans both the first and second slots. In some cases, there may be a restriction on the maximum number of transport channel (TrCH) bits receivable in a transmission time interval (TTI). A shared channel and an enhanced control channel may not be multiplexed within a physical resource block (PRB) pair.

In some cases, to improve a coordinated multipoint (CoMP) operation, a demodulation reference signal for a shared channel, such as the physical downlink shared channel (PDSCH), may be initialized based on one of two virtual cell IDs. The demodulation reference signal associated with the PDSCH may also be referred to as a UE-specific reference signal (UE-RS). In one configuration, the virtual cell ID that is specified for the shared channel demodulation reference signal is dynamically indicated via a one-bit scrambling ID in a downlink control information (DCI) format 2D. Specifically, at the start of each subframe, the shared channel demodulation reference signal sequence generator may be initialized with:

$$c_{init}=(\lfloor n_s/2 \rfloor+1)\cdot(2N_{ID}^{cell}+1)\cdot 2^{16}+n_{SCID} \quad (1)$$

In equation 1, $n_{SCID}$ is a scrambling ID. Furthermore, $N_{ID}^{cell}$ is a virtual cell ID and is configured by UE-specific higher layer signaling. Two candidate values of $N_{ID}^{cell}$ may be configured, $N_{ID}^{cell}(0)$ and $N_{ID}^{cell}(1)$. For rank one and rank two, the scrambling ID ($n_{SCID}$) is reused for the dynamic selection of $N_{ID}^{cell}(0)$ or $N_{ID}^{cell}(1)$. Alternatively, the scrambling ID ($n_{SCID}$) is equal to zero and the virtual cell ID $(N_{ID}^{cell})(0)$ is used when the rank is greater than two. The value of the virtual cell ID $(N_{ID}^{cell})(n)$ may be between 0 and 503, furthermore, n is greater than or equal to zero and less than two.

As previously discussed, the enhanced control channel may occupy the same data region as the shared channel. Because the enhanced control channel and the shared channel can occupy the same data region, in some cases, a same resource block (RB) may be used by the enhanced control channel demodulation reference signal, the shared channel demodulation reference signal, or a combination thereof. Thus, it may be desirable for a UE to differentiate between the enhanced control channel demodulation reference signal and the shared channel demodulation reference signal when performing various processes, such as interference handling, demodulating, and/or decoding.

In LTE Release 11, the enhanced control channel demodulation reference signal and the shared channel demodulation reference signal use the same scrambling sequence generator. At the start of each subframe, the scrambling sequence generator for the enhanced control channel (EPDCCH) DM-RS on ports 107-110 may be initialized with:

$$c_{init}=(\lfloor n_s/2 \rfloor+1)\cdot(2X+1)\cdot 2^{16}+n_{SCID} \quad (2)$$

In equation 2, X is a virtual cell ID and is configured by UE-specific higher layer signaling. As discussed above for the shared channel scrambling sequence, the scrambling ID ($n_{SCID}$) may be 0 or 1. Furthermore, in one configuration, for the enhanced control channel scrambling sequence, the value of the scrambling ID ($n_{SCID}$) is 0, 1, or 2. For example, the value of the scrambling ID for the enhanced control channel (e.g., 2) may be different from the possible values available for the scrambling ID of the shared channel (e.g., 0 or 1). Accordingly, the enhanced control channel demodulation reference signal can be differentiated from the shared channel demodulation reference signal.

The different scrambling ID values available for the enhanced control channel may provide for interference handling, interference estimation, and/or interference coordination between the enhanced control channel and the shared channel. For example, based on the scrambling ID, a UE may determine whether the demodulation reference signal was transmitted for an enhanced control channel or a shared channel from an interfering cell. The scrambling ID is not limited to the values discussed above and may be any value that provides for the scrambling sequence generator to differentiate between the enhanced control channel demodulation reference signal and the shared channel demodulation reference signal.

Additionally, for equation 2, the value of the virtual cell ID (X) may also be used to differentiate between an enhanced control channel demodulation reference signal and a shared control channel demodulation reference signal. In one configuration, the virtual cell ID may be the same as the physical cell ID. For example, for an enhanced control channel demodulation reference signal scrambling sequence, the virtual cell ID may be the same as the physical cell ID and a scrambling ID ($n_{SCID}$) may be equal to 2.

In another configuration, the virtual cell ID (X) for the enhanced control channel demodulation reference signal scrambling sequence may be selected based on only one configured virtual cell ID or one of two configured virtual cell IDs. The present configuration may improve cell offloading and load balancing. For example, an enhanced control channel intended for a UE associated with a first cell that uses a typical control channel may be transmitted from a second cell to balance the load of the first cell. Specifically, for the enhanced control channel demodulation reference signal scrambling sequence of the second cell, the virtual cell ID may be the same as the physical cell ID of the second cell.

Still, in another configuration, the virtual cell ID of the enhanced control channel transmitted from the second cell may be configured to use the physical cell ID of the first cell. That is, the enhanced control channel demodulation reference signal may be transmitted in a transparent manner.

Configuring the virtual cell ID for the scrambling sequence based on one configured virtual cell ID or one of two configured virtual cell IDs may increase the networks complexity. For example, if two virtual cell IDs are configured for an enhanced control channel, an increased number of blind decodes may be specified when each decoding candidate is associated with two virtual cell IDs for the enhanced control channel.

Still, a maximum number of blind decodes may be maintained when two virtual cell IDs are configured for an enhanced control channel. In one configuration, the maximum number of blind decodes is maintained by associating each enhanced control channel decoding candidate with a specific virtual cell ID. In another configuration, the maximum number of blind decodes is maintained by associating each enhanced control channel set with a specific virtual cell ID. In yet another configuration, the maximum number of blind decodes is maintained by associating each physical resource block (PRB) pair with a specific virtual cell ID.

Furthermore, specific rules may be defined and signaled to maintain a specific number of blind decodes when two virtual cell IDs are configured for the enhanced control channel. Moreover, it may be desirable to separately configure the set of enhanced control channel virtual cell IDs and the set of shared channel virtual cell IDs. Additionally, in one configuration, in addition to being separately configured, the enhanced control channel virtual cell IDs and the set of shared channel virtual cell IDs use different values. Accordingly, the UE may improve interference handling by differentiating the enhanced control channel from the shared channel when the set of enhanced control channel virtual cell IDs and the set of shared channel virtual cell IDs are configured separately and given different values.

In another configuration, two or more UEs may share the same resource block in a multi-user multiple-input and multiple-output (MU-MIMO) operation. However, each UE is not aware that it is sharing the same resource block in the MU-MIMO operation with the other UEs. If a virtual cell ID is used in one resource block for a UE, then the UE may assume that the other UEs are sharing the same resource block by using different orthogonal cover codes (e.g., Walsh codes) in addition to the same UE reference signal sequence or demodulation reference signal sequence derived from the same virtual cell ID. Accordingly, the UE may detect whether signals are targeted for the other UEs in the same resource block (e.g. MU-MIMO operation). The detection of the signals for the other UEs may improve the UE's interference handling.

Figure 8:
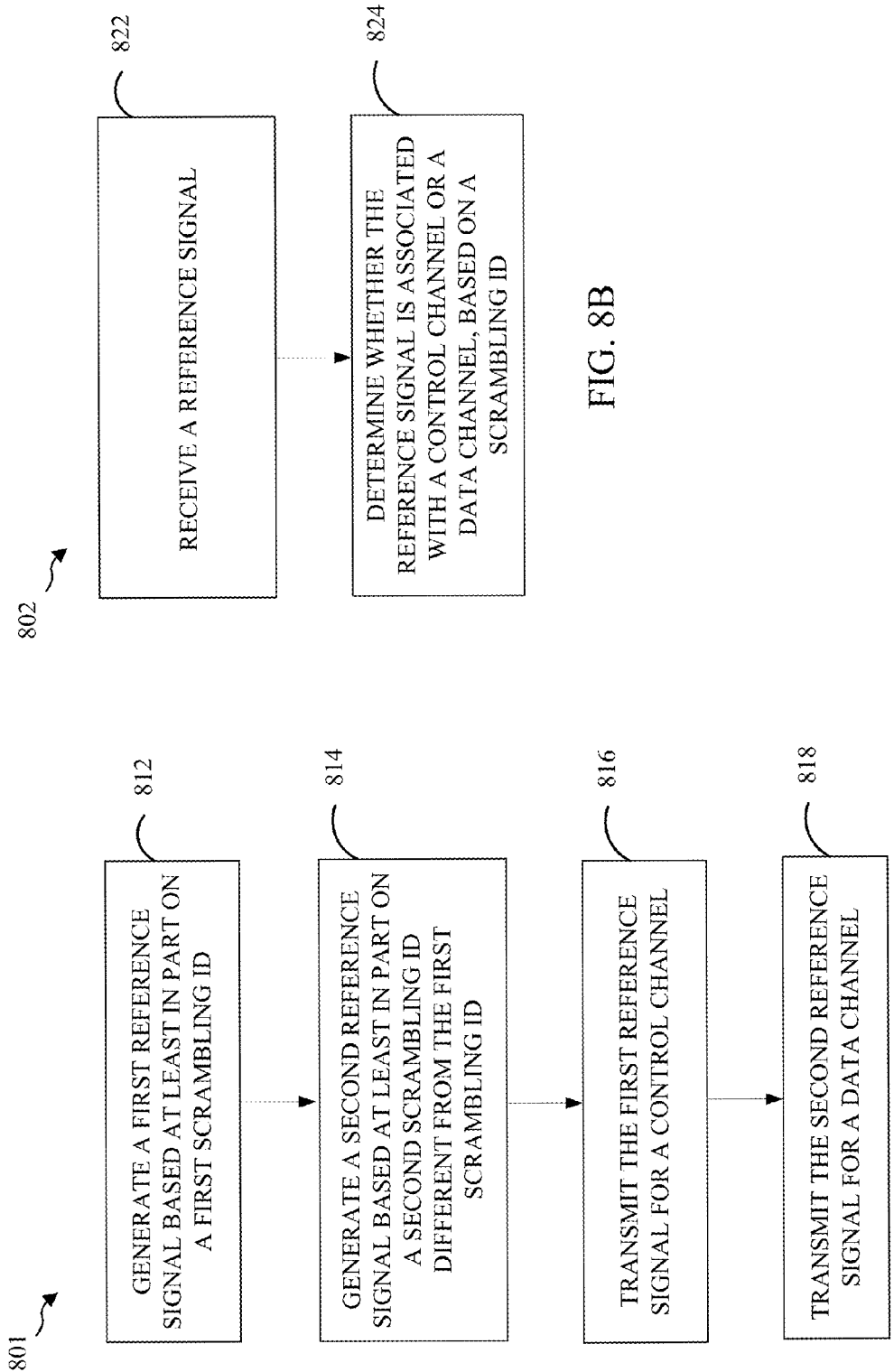
FIG. 8A is a block diagram illustrating a method for generating an enhanced control channel demodulation reference signal according to an aspect of the present disclosure.
FIG. 8B is a block diagram illustrating a method for detecting an enhanced control channel demodulation reference signal according to an aspect of the present disclosure.

FIG. 8A illustrates a method 801 for transmitting an enhanced control channel demodulation reference signal, such as the EPDCCH DM-RS, according to an aspect of the present disclosure. In block 812, an eNodeB generates a first reference signal based on a first scrambling ID. In block 814, the eNodeB generates a second reference signal based on a second scrambling ID. The second scrambling ID is different from the first scrambling ID. Additionally, in block 818, the eNodeB transmits the first reference signal for a control channel. Finally, in block 820, the eNodeB transmits the second reference signal for a data channel.

FIG. 8B illustrates a method 802 for determining whether a demodulation reference signal is associated with an enhanced control channel or a shared channel. In block 822, the UE receives a reference signal. In block 824, the UE determines whether the reference signal is associated with a control channel or a data channel. The determination is based on a scrambling ID.

Figure 9:
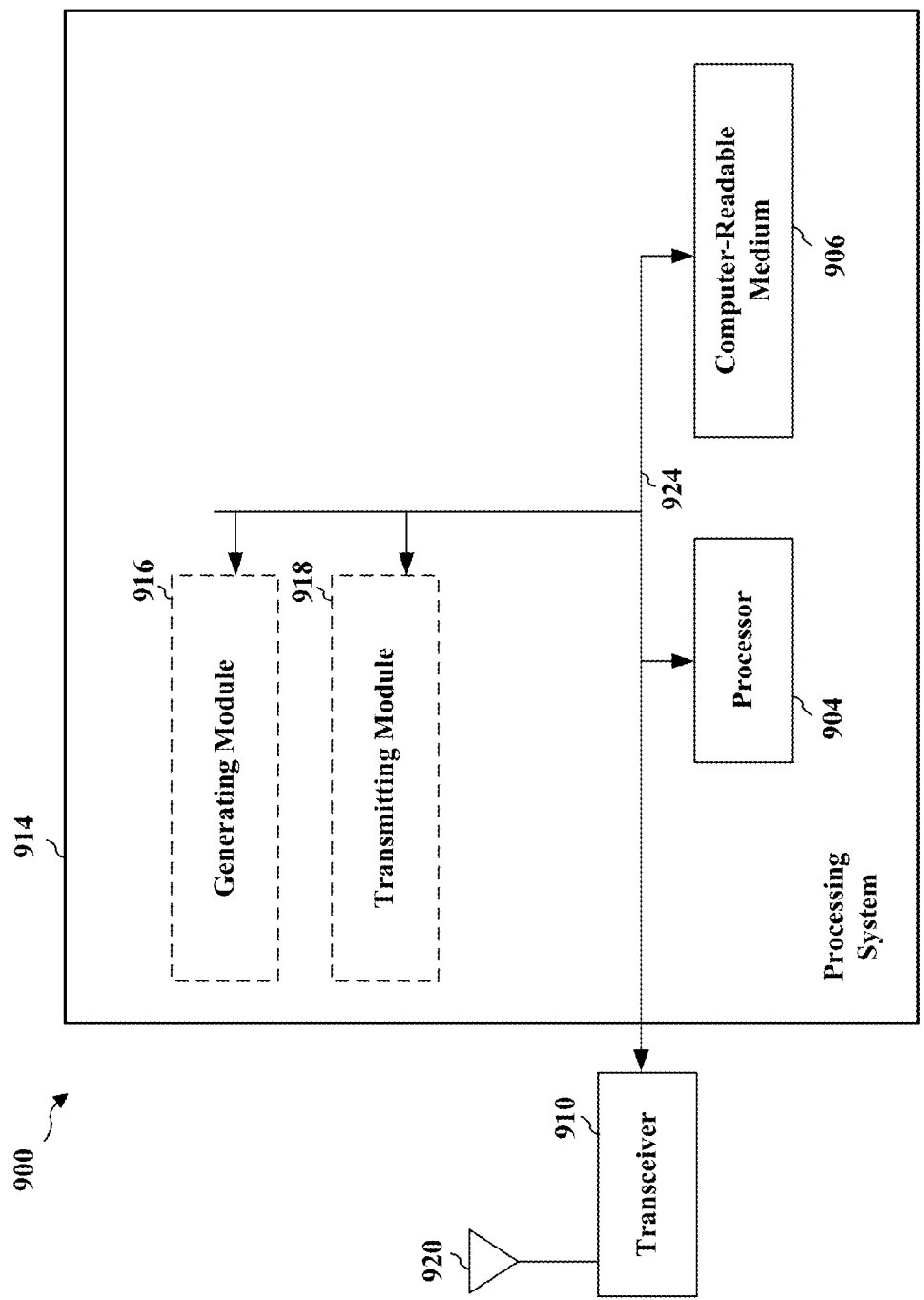
FIG. 9 is a block diagram illustrating different modules/means/components in an exemplary apparatus.

FIG. 9 is a diagram illustrating an example of a hardware implementation for an apparatus 900 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors and/or hardware modules, represented by the processor 904, and the computer-readable medium 906. Additionally, the bus may also link various modules, such as modules 916 and 918. The bus 924 may also link various other circuits such as timing sources, peripherals, voltage regulators, and power management circuits, which are well known in the art, and therefore, will not be described any further.

The apparatus includes a processing system 914 coupled to a transceiver 910. The transceiver 910 is coupled to one or more antennas 920. The transceiver 910 enables communicating with various other apparatus over a transmission medium. The processing system 914 includes a processor 904 coupled to a computer-readable medium 906. The processor 194 is responsible for general processing, including the execution of software stored on the computer-readable medium 906. The software, when executed by the processor 904, causes the processing system 914 to perform the various functions described for any particular apparatus. The computer-readable medium 906 may also be used for storing data that is manipulated by the processor 904 when executing software.

The apparatus 900 includes a generating module 916 that generates a first reference signal based at least in part on a first scrambling ID. The generating module 916 may also generate a second reference signal based at least in part on a second scrambling ID. The second scrambling ID is different from the first scrambling ID. The apparatus 900 also includes a transmitting module 918 that transmits the first reference signal for a control channel. The transmitting module 918 may also transmit the second reference signal for a data channel. Because the scrambling identifier for the first reference signal is different from a scrambling identifier used for a second reference signal of the shared channel, the first reference signal can be differentiated from a second reference signal. The modules may be one or more hardware components specifically configured to carry out the stated processes/algorithm, implemented by a processor configured to perform the stated processes/algorithm, stored within a computer-readable medium for implementation by a processor, or some combination thereof.

In one aspect of the present disclosure, the eNodeB 610 is configured for wireless communication including means for generating. In one configuration, the means for generating may be the controller/processor 675, generating module 916, processing system 914, memory 676, and/or transmit processor 616 configured to perform the functions recited by the generating means. The eNodeB 610 is also configured to include a means for transmitting. In one configuration, the means for transmitting may be the transmit processor 616, modulators 618, controller/processor 675, transmitting module 918, processing system 914, and/or antennas 620 configured to perform the functions recited by the transmitting means. In another configuration, the aforementioned means may be any module or any apparatus configured to perform the functions recited by the aforementioned means.

Figure 10:
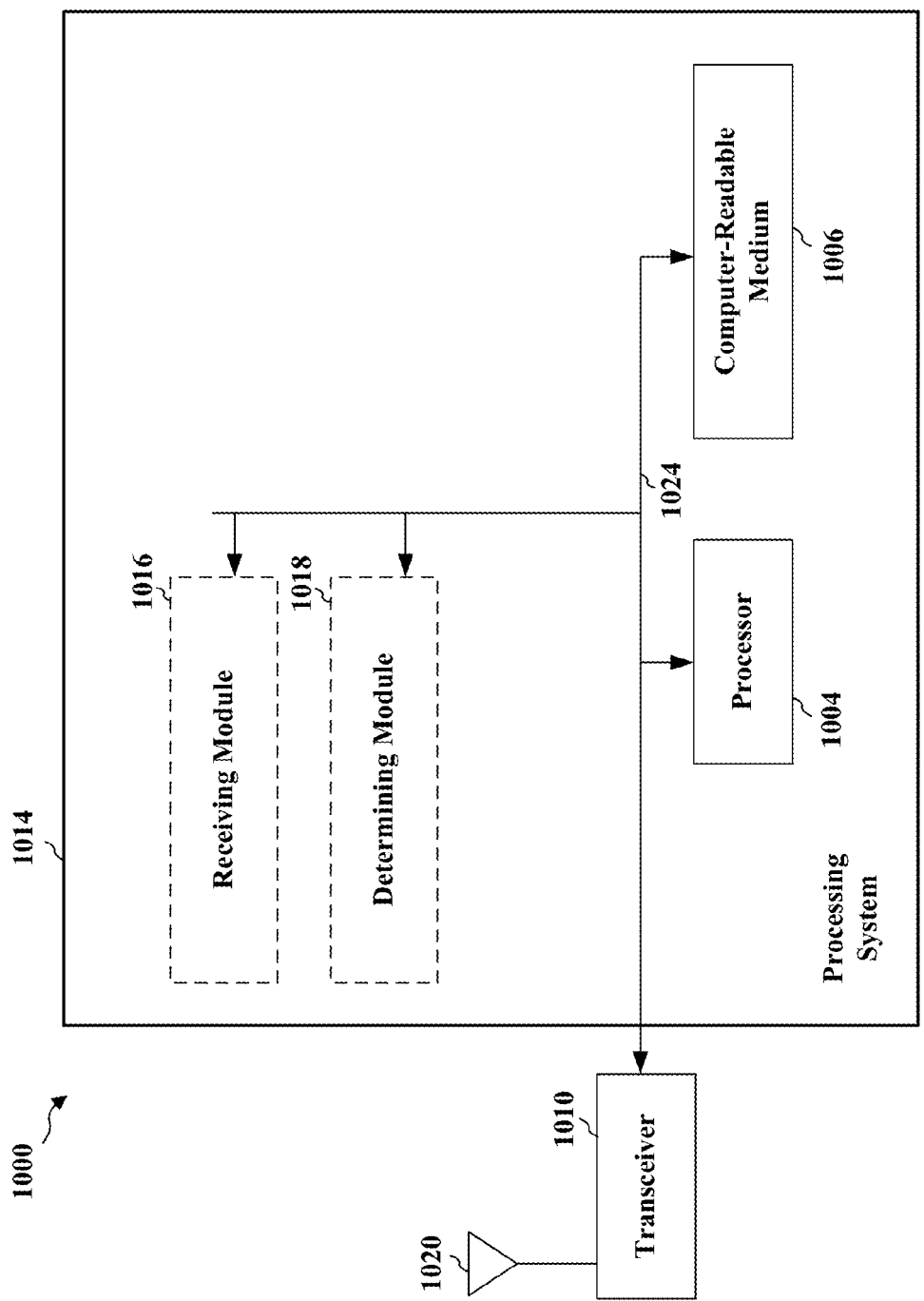
FIG. 10 is a block diagram illustrating different modules/means/components in an exemplary apparatus.

FIG. 10 is a diagram illustrating an example of a hardware implementation for an apparatus 1000 employing a processing system 1014. The processing system 1014 may be implemented with a bus architecture, represented generally by the bus 1024. The bus 1024 may include any number of interconnecting buses and bridges depending on the specific application of the processing system 1014 and the overall design constraints. The bus 1024 links together various circuits including one or more processors and/or hardware modules, represented by the processor 1004, and the computer-readable medium 1006. Additionally, the bus may also link various modules, such as modules 1016 and 1018. The bus 1024 may also link various other circuits such as timing sources, peripherals, voltage regulators, and power management circuits, which are well known in the art, and therefore, will not be described any further.

The apparatus includes a processing system 1014 coupled to a transceiver 1010. The transceiver 1010 is coupled to one or more antennas 1020. The transceiver 1010 enables communicating with various other apparatus over a transmission medium. The processing system 1014 includes a processor 1004 coupled to a computer-readable medium 1006. The processor 1004 is responsible for general processing, including the execution of software stored on the computer-readable medium 1006. The software, when executed by the processor 1004, causes the processing system 1014 to perform the various functions described for any particular apparatus. The computer-readable medium 1006 may also be used for storing data that is manipulated by the processor 1004 when executing software.

The processing system may include a receiving module 1016 and a determining module 1018. The receiving module 1016 can receive a reference signal. The determining module 1018 can determine whether the reference signal is associated with a control channel or a data channel, based at least in part on a scrambling ID. The modules 1016, 1018 may be software modules running in the processor 1004, resident/stored in the computer-readable medium 1006, one or more hardware modules coupled to the processor 1004, or some combination thereof. The processing system 1014 may include one of the modules or both of the modules. The processing system 1014 may be a component of the UE 650 and may include the memory 660, the transmit processor 668, the receive processor 656, the modulators/demodulators 654, the antenna 652, and/or the controller/processor 659.

In one aspect of the present disclosure, the UE 650 is configured for wireless communication including means for receiving. In one configuration, the receiving means may be the receive processor 656, modulators 644, antenna 652, controller/processor 659, receiving module 1016, processing system 1014, and/or memory 660 configured to perform the functions recited by the receiving means. The UE 650 is also configured to include a means for determining. In one configuration, the determining means may be the controller/processor 659, memory 660, determining module 1018, processing system 1014 and/or receive processor 656, configured to perform the functions recited by the determining means. In another aspect, the aforementioned means may be any module or any apparatus configured to perform the functions recited by the aforementioned means.

Figure 11:
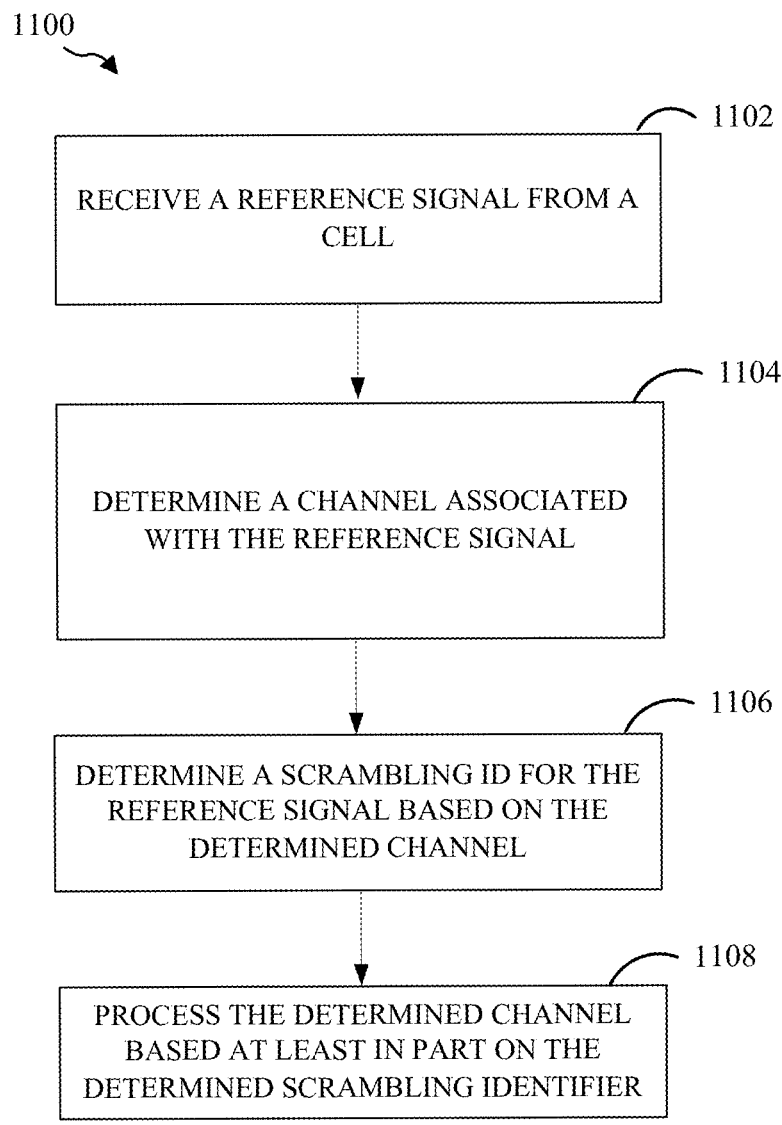
FIG. 11 is a block diagram illustrating a method for detecting an enhanced control channel demodulation reference signal according to an aspect of the present disclosure.

FIG. 11 illustrates a method 1100 for determining whether a reference signal is associated with an enhanced control channel or a shared channel. In block 1102, the UE receives a reference signal from a cell. In block 1104, the UE determines a channel associated with the reference signal, the channel being a control channel or a data channel. In block 1106, the UE determines a scrambling ID for the reference signal based on the determined channel. Finally, in block 1108, the UE processes the determined channel based at least in part on the determined scrambling identifier.

Figure 12:
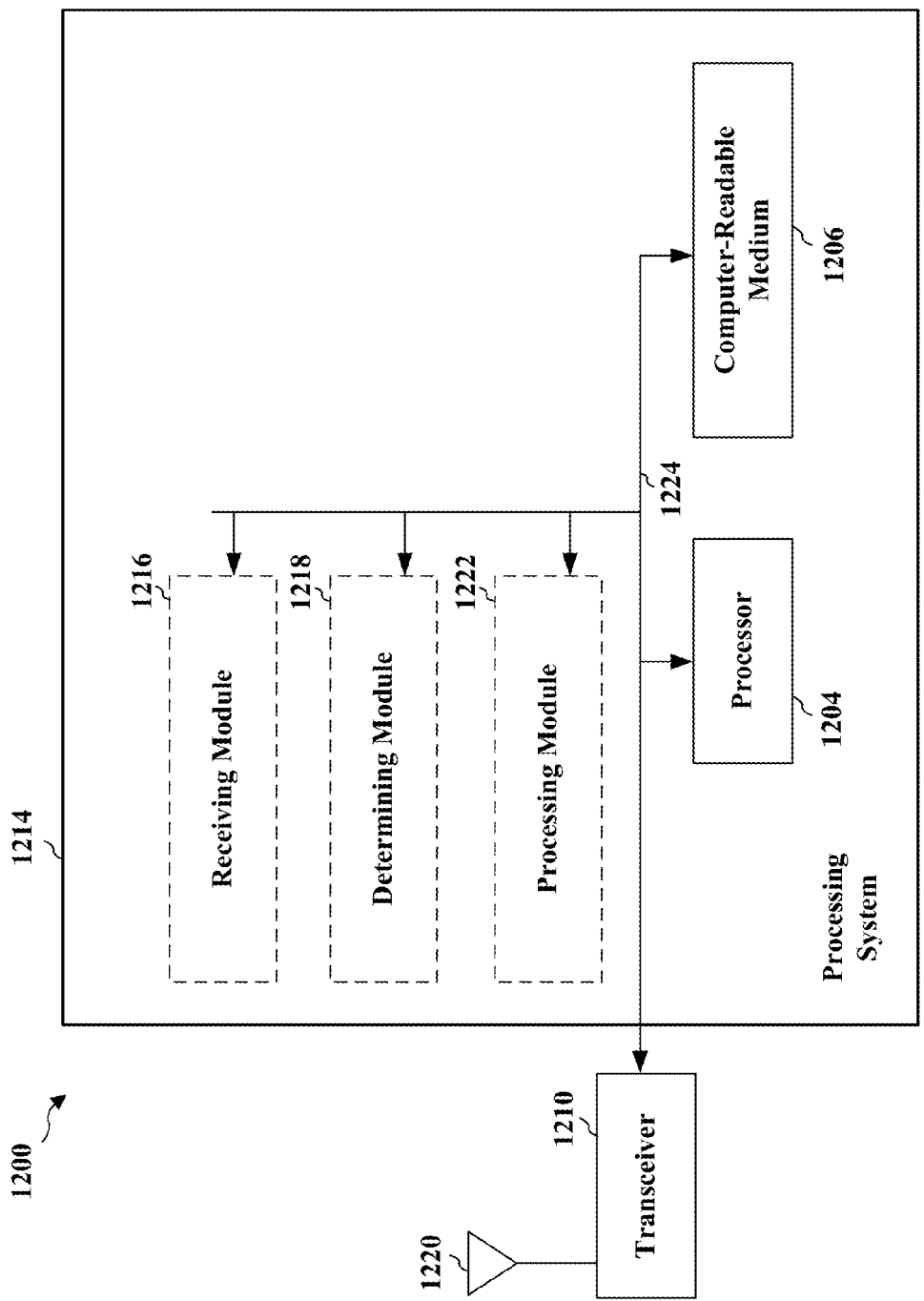
FIG. 12 is a block diagram illustrating different modules/means/components in an exemplary apparatus.

FIG. 12 is a diagram illustrating an example of a hardware implementation for an apparatus 1200 employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, and the computer-readable medium 1206. Additionally, the bus may also link various modules, such as modules 1216, 1218, 1222. The bus 1224 may also link various other circuits such as timing sources, peripherals, voltage regulators, and power management circuits, which are well known in the art, and therefore, will not be described any further.

The apparatus includes a processing system 1214 coupled to a transceiver 1210. The transceiver 1210 is coupled to one or more antennas 1220. The transceiver 1210 enables communicating with various other apparatus over a transmission medium. The processing system 1214 includes a processor 1204 coupled to a computer-readable medium 1206. The processor 1124 is responsible for general processing, including the execution of software stored on the computer-readable medium 1206. The software, when executed by the processor 1204, causes the processing system 1214 to perform the various functions described for any particular apparatus. The computer-readable medium 1206 may also be used for storing data that is manipulated by the processor 1204 when executing software.

The apparatus 1200 includes a receiving module 1216 that receives a reference signal from a cell. The apparatus 1200 also includes a determining module 1218 that determines a channel associated with the reference signal. The channel is either a control channel or a data channel. The determining module 1218 may also determine a scrambling ID for the reference signal based on the determined channel. In one configuration, the determining module 1218 may be separate modules (not shown). Furthermore, the apparatus 1200 further includes a processing module 1222 for processing the determined channel based at least in part on the determined scrambling identifier. The modules may be one or more hardware components specifically configured to carry out the stated processes/algorithm, implemented by a processor configured to perform the stated processes/algorithm, stored within a computer-readable medium for implementation by a processor, or some combination thereof.

In one aspect of the present disclosure, the UE 650 is configured for wireless communication including means for receiving. In one configuration, the receiving means may be the receive processor 656, modulators 644, antenna 652, controller/processor 659, receiving module 1216, processing system 1214, and/or memory 660 configured to perform the functions recited by the receiving means. The UE 650 is also configured to include a means for determining. In one configuration, the determining means may be the controller/processor 659, memory 660, determining module 1218, and/or processing system 1214, configured to perform the functions recited by the determining means. The UE 650 is also configured to include a means for processing. In one configuration, the determining means may be the controller/processor 659, memory 660, processing module 1222, and/or processing system 1214, configured to perform the functions recited by the processing means. In another aspect, the aforementioned means may be any module or any apparatus configured to perform the functions recited by the aforementioned means.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
    generating a demodulation reference signal (DM-RS) based at least in part on a single scrambling identifier (ID) having a value of 2;
    generating a user equipment specific reference signal (UE-RS) based at least in part on a single scrambling ID having a value of 0 or 1, the value of the single scrambling ID for the DM-RS being different from the value of the single scrambling ID of the UE-RS such that the DM-RS is distinguishable from the UE-RS;
    transmitting the DM-RS for an enhanced control channel that uses resources selected from at least a data region of a subframe; and
    transmitting the UE-RS for a data channel that uses resources selected from the data region.

2. The method of claim 1, in which the enhanced control channel comprises an enhanced physical downlink control channel (EPDCCH) and the data channel comprises a physical downlink shared channel (PDSCH).

3. The method of claim 1, in which the DM-RS is also based at least in part on a cell identifier that is configured separately from the cell identifier of the UE-RS.

4. The method of claim 3, in which the cell identifier comprises a physical cell identifier (PCI).

5. The method of claim 3, in which the cell identifier comprises a virtual cell identifier.

6. A method of wireless communication, comprising:
    receiving a reference signal; and
    determining whether the reference signal is a demodulation reference signal (DM-RS) associated with an enhanced control channel or a user equipment specific reference signal (UE-RS) associated with a data channel based at least in part on a value of a single scrambling identifier (ID), the enhanced control channel using resources selected from at least a data region of a subframe and the data channel using resources selected from the data region, the reference signal being the DM-RS when the value of the single scrambling ID is 2, the reference signal being the UE-RS when the value of the single scrambling ID is 0 or 1, and the value of the single scrambling ID for the DM-RS being different from the value of the single scrambling ID of the UE-RS such that the DM-RS is distinguishable from the UE-RS.

7. The method of claim 6, in which the enhanced control channel comprises an enhanced physical downlink control channel (EPDCCH) and the data channel comprises a physical downlink shared channel (PDSCH).

8. The method of claim 6, in which the reference signal is further based on a cell identifier common for the enhanced control channel and the data channel.

9. The method of claim 6, in which the reference signal is further based on:
   a first cell identifier for the enhanced control channel, and
   a second cell identifier for the data channel, the second cell identifier being configured separately from the first cell identifier.

10. The method of claim 6, in which the reference signal is received within a physical resource block (PRB).

11. A method of wireless communication, comprising:
   receiving a reference signal from a cell;
   determining whether a channel associated with the reference signal is an enhanced control channel, such that the reference signal is a demodulation reference signal (DM-RS), or a data channel, such that the reference signal is a user equipment specific reference signal (UE-RS), the enhanced control channel using resources selected from at least a data region of a subframe, and the data channel using resources selected from the data region;
   determining a value for a single scrambling identifier (ID) for the reference signal based on the determined channel, the value being 2 for the DM-RS, the value being 0 or 1 for the UE-RS, and the value of the single scrambling ID for the DM-RS being different from the value of the single scrambling ID of the UE-RS such that the DM-RS is distinguishable from the UE-RS; and
   processing the determined channel based at least in part on the determined value scrambling ID.

12. The method of claim 11, in which the enhanced control channel comprises an enhanced physical downlink control channel (EPDCCH) and the data channel comprises a physical downlink shared channel (PDSCH).

13. The method of claim 11, in which the reference signal is further based on a cell identifier, the cell identifier being configured separately for the UE-RS and the DM-RS.

14. The method of claim 13, in which the cell identifier comprises a physical cell identifier (PCI).

15. The method of claim 13, in which the cell identifier comprises a virtual cell identifier.

16. The method of claim 11, in which the reference signal is received within a physical resource block (PRB).

17. An apparatus for wireless communications, comprising:
   a memory; and
   at least one processor coupled to the memory, the at least one processor being configured:
      to generate a demodulation reference signal (DM-RS) based at least in part on a single scrambling identifier (ID) having a value of 2;
      to generate a user equipment specific reference signal (UE-RS) based at least in part on a single scrambling ID having a value of 0 or 1, the value of the single scrambling ID for the DM-RS being different from the value of the single scrambling ID of the UE-RS such that the DM-RS is distinguishable from the UE-RS;
      to transmit the DM-RS for an enhanced control channel that uses resources selected from at least a data region of a subframe; and
      to transmit the UE-RS for a data channel that uses resources selected from the data region.

18. The apparatus of claim 17, in which the enhanced control channel comprises an enhanced physical downlink control channel (EPDCCH) and the data channel comprises a physical downlink shared channel (PDSCH).

19. The apparatus of claim 17, in which the DM-RS is further based on a cell identifier that is configured separately from the cell identifier of the UE-RS.

20. The apparatus of claim 19, in which the cell identifier comprises a physical cell identifier (PCI).

21. The apparatus of claim 19, in which the cell identifier comprises a virtual cell identifier.

22. An apparatus for wireless communications, comprising:
   a memory; and
   at least one processor coupled to the memory, the at least one processor being configured:
      to receive a reference signal; and
      to determine whether the reference signal is a demodulation reference signal (DM-RS) associated with an enhanced control channel or a user equipment specific reference signal (UE-RS) associated with a data channel based at least in part on a value of a single scrambling identifier (ID), the enhanced control channel using resources selected from at least a data region of a subframe and the data channel using resources selected from the data region, the reference signal being the DM-RS when the value of the single scrambling ID is 2, the reference signal being the UE-RS when the value of the single scrambling ID is 0 or 1, and the value of the single scrambling ID for the DM-RS being different from the value of the single scrambling ID of the UE-RS such that the DM-RS is distinguishable from the UE-RS.

23. The apparatus of claim 22, in which the reference signal comprises a demodulation reference signal (DM-RS).

24. The apparatus of claim 22, in which the enhanced control channel comprises an enhanced physical downlink control channel (EPDCCH) and the data channel comprises a physical downlink shared channel (PDSCH).

25. The apparatus of claim 22, in which the reference signal is further based on a cell identifier common for the enhanced control channel and the data channel.

26. The apparatus of claim 22, in which the reference signal is further based on:
   a first cell identifier for the enhanced control channel, and
   a second cell identifier for the data channel, the second cell identifier being configured separately from the first cell identifier.

27. The apparatus of claim 22, in which the reference signal is received within a physical resource block (PRB).

28. An apparatus for wireless communications, comprising:
   a memory; and
   at least one processor coupled to the memory, the at least one processor being configured:
      to receive a reference signal from a cell;
      to determine whether a channel associated with the reference signal is an enhanced control channel, such that the reference signal is a demodulation reference signal (DM-RS), or a data channel, such that the reference signal is a user equipment specific reference signal (UE-RS), the enhanced control channel using resources selected from at least a data region of a subframe, and the data channel using resources selected from the data region;

to determine a value for a single scrambling identifier (ID) for the reference signal based on the determined channel, the value being 2 for the DM-RS, the value being 0 or 1 for the UE-RS, and the value of the single scrambling ID for the DM-RS being different from the value of the single scrambling ID of the UE-RS such that the DM-RS is distinguishable from the UE-RS; and to process the determined channel based at least in part on the determined scrambling ID value.

29. The apparatus of claim 28, in which the enhanced control channel comprises an enhanced physical downlink control channel (EPDCCH) and the data channel comprises a physical downlink shared channel (PDSCH).

30. The apparatus of claim 28, in which the reference signal is further based on a cell identifier, the cell identifier being configured separately for the UE-RS and the DM-RS.

31. The apparatus of claim 30, in which the cell identifier comprises a physical cell identifier (PCI).

32. The apparatus of claim 30, in which the cell identifier comprises a virtual cell identifier.

33. The apparatus of claim 28, in which the reference signal comprises received within a physical resource block (PRB).

34. An apparatus for wireless communications, comprising:
means for generating a demodulation reference signal (DM-RS) based at least in part on a single scrambling identifier (ID) having a value of 2;
means for generating a user equipment specific reference signal (UE-RS) based at least in part on a single scrambling ID having a value of 0 or 1, the value of the single scrambling ID for the DM-RS being different from the value of the single scrambling ID of the UE-RS such that the DM-RS is distinguishable from the UE-RS;
means for transmitting the DM-RS for an enhanced control channel that uses resources selected from at least a data region of a subframe; and
means for transmitting the UE-RS for a data channel that uses resources selected from the data region.

35. An apparatus for wireless communications, comprising:
means for receiving a reference signal; and
means for determining whether the reference signal is a demodulation reference signal (DM-RS) associated with an enhanced control channel or a user equipment specific reference signal (UE-RS) associated with a data channel based at least in part on a value of a single scrambling identifier (ID), the enhanced control channel using resources selected from at least a data region of a subframe and the data channel using resources selected from the data region, the reference signal being the DM-RS when the value of the single scrambling ID is 2, the reference signal being the UE-RS when the value of the single scrambling ID is 0 or 1, and the value of the single scrambling ID for the DM-RS being different from the value of the single scrambling ID of the UE-RS such that the DM-RS is distinguishable from the UE-RS.

36. An apparatus for wireless communications, comprising:
means for receiving a reference signal from a cell;
means for determining whether a channel associated with the reference signal is an enhanced control channel, such that the reference signal is a demodulation reference signal (DM-RS), or a data channel, such that the reference signal is a user equipment specific reference signal (UE-RS), the enhanced control channel using resources selected from at least a data region of a subframe, and the data channel using resources selected from the data region;
means for determining a value for a single scrambling identifier (ID) for the reference signal based on the determined channel, the value being 2 for the DM-RS, the value being 0 or 1 for the UE-RS, and the value of the single scrambling ID for the DM-RS being different from the value of the single scrambling ID of the UE-RS such that the DM-RS is distinguishable from the UE-RS; and
means for processing the determined channel based at least in part on the value determined for the single scrambling ID.

37. A non-transitory computer-readable medium having program code recorded thereon, the program code comprising:
program code to generate a demodulation reference signal (DM-RS) based at least in part on a single scrambling identifier (ID) having a value of 2;
program code to generate a user equipment specific reference signal (UE-RS) based at least in part on a single scrambling ID having a value of 0 or 1, the value of the single scrambling ID for the DM-RS being different from the value of the single scrambling ID of the UE-RS such that the DM-RS is distinguishable from the UE-RS;
program code to transmit the DM-RS for an enhanced control channel that uses resources selected from at least a data region of a subframe; and
program code to transmit the UE-RS for a data channel that uses resources selected from the data region.

38. A non-transitory computer-readable medium having program code recorded thereon, the program code comprising:
program code to receive a reference signal; and
program code to determine whether the reference signal is a demodulation reference signal (DM-RS) associated with an enhanced control channel or a user equipment specific reference signal (UE-RS) associated with a data channel based at least in part on a value of a single scrambling identifier (ID), the enhanced control channel using resources selected from at least a data region of a subframe and the data channel using resources selected from the data region, the reference signal being the DM-RS when the value of the single scrambling ID is 2, the reference signal being the UE-RS when the value of the single scrambling ID is 0 or 1, and the value of the single scrambling ID for the DM-RS being different from the value of the single scrambling ID of the UE-RS such that the DM-RS is distinguishable from the UE-RS.

39. A non-transitory computer-readable medium having program code recorded thereon, the program code comprising:
program code to receive a reference signal from a cell;
program code to determine whether a channel associated with the reference signal is an enhanced control channel, such that the reference signal is a demodulation reference signal (DM-RS), or a data channel, such that the reference signal is a user equipment specific reference signal (UE-RS), the enhanced control channel using resources selected from at least a data region of a subframe, and the data channel using resources selected from the data region;
program code to determine a value for a single scrambling identifier (ID) for the reference signal based on the determined channel, the value being 2 for the DM-RS, the value being 0 or 1 for the UE-RS, and the value of the single scrambling ID for the DM-RS being different from the value of the single scrambling ID of the UE-RS such that the DM-RS is distinguishable from the UE-RS; and program code to process the determined channel based at least in part on the determined scrambling ID value.

* * * * *